United States Patent [19]
Inagawa et al.

[11] Patent Number: 5,815,476
[45] Date of Patent: Sep. 29, 1998

[54] DISC DATA REPRODUCING APPARATUS AND SIGNAL PROCESSING CIRCUIT

[75] Inventors: Jun Inagawa; Yasuhiro Hayashi; Makoto Kubo, all of Kanagawa-ken, Japan

[73] Assignee: Kabushiki Kaisha Toshiba, Kawasaki, Japan

[21] Appl. No.: 957,921

[22] Filed: Oct. 27, 1997

Related U.S. Application Data

[62] Division of Ser. No. 450,657, May 25, 1995, Pat. No. 5,729,515.

[30]  Foreign Application Priority Data

May 26, 1994  [JP]  Japan .................................. 6-136451
Jul. 7, 1994  [JP]  Japan .................................. 6-177753

[51] Int. Cl.$^6$ ................................................ G11B 20/10
[52] U.S. Cl. ............................ 369/48; 369/54; 369/50; 369/58; 369/60
[58] Field of Search .............................. 369/47, 48, 49, 369/50, 54, 58, 59, 124, 60; 360/51

[56] References Cited

U.S. PATENT DOCUMENTS

| | | | |
|---|---|---|---|
| 4,631,714 | 12/1986 | Kahlman et al. | 369/59 |
| 4,672,471 | 6/1987 | Gouda | 369/49 |
| 5,166,804 | 11/1992 | Takahashi | 369/50 |
| 5,553,041 | 9/1996 | Ingawa et al. | 369/48 |

FOREIGN PATENT DOCUMENTS

| | | |
|---|---|---|
| 0 485 234 A3 | 5/1992 | European Pat. Off. . |
| 0 638 900 | 2/1995 | European Pat. Off. . |
| 62-224124 | 10/1987 | Japan . |
| 6-203482 | 7/1994 | Japan . |
| 7-21691 | 1/1995 | Japan . |

OTHER PUBLICATIONS

Nikkei Electronics, vol. 628, pp. 111–119 (Feb. 13, 1995).

*Primary Examiner*—Thang V. Tran
*Attorney, Agent, or Firm*—Finnegan, Henderson, Farabow, Garrett & Dunner, L.L.P.

[57]  ABSTRACT

An apparatus and a signal processing circuit for reproducing data stored on a disc to prevent a buffer memory from experiencing overflow/underflow, and/or to reduce power consumption in a digital-to-analog converter. When the data to be read is ROM data, reading from the buffer memory is conducted in response to a varying frame clock signal, and the frequency of a reference clock signal to the digital-to-analog converter is reduced.

12 Claims, 5 Drawing Sheets

DISC DATA REPRODUCING APPARATUS AND SIGNAL PROCESSING CIRCUIT

This is a division of application Ser. No. 08/450,657, filed May 25, 1995, now U.S. Pat. No. 5,729,515.

BACKGROUND OF THE INVENTION

Field of the Invention

The present invention generally relates to an optical record disc player such as a compact disc player and its signal processing circuit, and more particularly, relates to apparatus and circuitry for reading out reproduced data from a buffer memory.

As is well known in the field of audio equipment, digital record reproducing systems have been gene rally adopted for the purpose of reproducing recorded data of high density and high fidelity. In these systems, audio analog signals are converted into digitized data by a PCM (Pulse Code Modulation) technique; this data is recorded on a recording medium, such as a disc or a magnetic tape, to be reproduced. Among these systems, the compact disc is mainly used at present. In this case, a binary digit (bit) corresponding to the digitized data is formed on a disc of about 12 cm in diameter, and is optically read.

A reproducing device for reproducing the data recorded on the compact disc moves an optical pickup provided with a semiconductor laser and a photoelectric conversion device in a constant linear velocity tracking system (CLV) from the inner periphery side to the outer periphery side of the disc, and rotates the compact disc to read the data recorded on the compact disc.

The data read out from the disc is supplied to an EFM signal generation circuit (hereinafter called RF circuit). This RF circuit extracts a focus error signal and tracking error signal from an output of the optical pickup, and supplies a servo control circuit with these extracted signals. The RF circuit also quantizes the signal read from the disc, and supplies a signal processing circuit with the quantized signal as an eight to fourteen bit modulated (EFM) signal. This signal processing circuit performs an EFM demodulation, a subcode demodulation, and error correction processing, then its output is supplied to a digital-to-analog converter (hereinafter called DAC). An output of the DAC is supplied to a low pass filter (LPF), and an output of the LPF corresponds to a reproduced audio output signal. In a reproduction device used with a CD, in order to prevent a final audio output from causing wow and flutter, the EFM demodulated signal is stored in a buffer memory and read out after the error correction processing using a stable frequency clock signal. This clock signal is synchronous with a clock signal generated by a crystal oscillator.

Besides the well-known audio CD player, a CD-ROM player is another reproducing apparatus using discs. The CD-ROM player may reproduce two kinds of data coexisting on the disc, i.e., audio data and ROM data. This ROM data includes character codes and image information such as photographic data and video data. The photographic data sometimes is compressed into a JPEG (Joint Photographic Coding Experts Group) type, and the video data is compressed into an MPEG (Moving Picture Coding Experts Group) type.

When the audio data is read out, the reproduction is performed at a normal rate corresponding to audible information. On the other hand, when ROM data is read out, the reproduction can be performed at a faster rate, such as a double rate. In a CD-ROM player, frequent switching between the normal rate and the double is performed.

Such frequent switching causes overflow and underflow to the buffer memory. The overflow and underflow result in an interruption in reproducing data in the CD-ROM player. An interruption in reproduction may also be caused by a search operation. These problems are explained in U.S. patent application Ser. No. 08/288,785.

Further, a CD-ROM player is used in a small portable computer, because CD-ROM discs can store great amounts of data. For this kind of computer, it is very important to reduce its power consumption in order to achieve a long-time operation. However, power consumption in such computers is increasing because of an increase in the operation frequency of the microprocessors.

SUMMARY OF THE INVENTION

It is an object of the invention to provide an improved reproducing apparatus using discs that is not subject to the above described problems and disadvantages.

It is an additional object of the present invention to provide an improved disc player wherein reproduction interruptions, or muting, caused by reproduction speed switching or a search operation are reduced.

It is another object of the present invention to provide an improved signal processing circuit for reducing reproduction interruptions caused by reproduction speed switching or a search operation.

It is further object of the present invention to provide an improved disc player with low-power consumption.

It is yet another object of the present invention to provide an improved signal processing circuit with low-power consumption.

In accordance with the present invention, the foregoing objects, among others, are achieved by providing an apparatus for reproducing disc data capable of being classified into at least a first type data and a second type data, the apparatus comprising: a disc motor to rotate a disc storing the disc data; an optical pickup to read the disc data to be reproduced from the disc; a demodulation circuit to demodulate the disc data read from the disc; a buffer memory to store the demodulated data; and a digital-to-analog converter to convert the demodulated data of the first type data read from the buffer memory in response to a reference clock signal; wherein, when the disc data to be reproduced is the first type data, a frequency of the reference clock signal is set to a first value, and when the disc data to be reproduced is the second type data, the frequency of the reference clock signal is set to a second value lower than the first value so as to reduce power consumption of the digital-to-analog converter.

In accordance with another aspect of the present invention, the above-stated objects are achieved by providing a signal processing circuit for use in reproducing disc data capable of being classified into at least a first type data and a second type data, the disc data being stored on a disc to be rotated by a disc motor and read from the disc by an optical pickup, comprising: a demodulation circuit to demodulate the disc data read from the disc; a buffer memory to store the demodulated data read from the disc; and a digital-to-analog converter to convert the demodulated data of the first type data read from the buffer memory in response to a reference clock signal; wherein, when the disc data to be reproduced is the first type data, a frequency of the reference clock signal is set to a first value, and when the disc data to be reproduced is the second type data, the frequency of the reference clock signal is set to a second value lower than the first value so as to reduce power consumption of the digital-to-analog converter.

In accordance with further aspect of the present invention, the above-stated objects are achieved by providing an apparatus for reproducing disc data capable of being classified into at least a first type data and a second type data, the apparatus comprising: a disc motor to rotate a disc storing the disc data; an optical pickup to read the disc data to be reproduced from the disc; a demodulation circuit to demodulate the disc data read from the disc; a buffer memory to store the demodulated data; a digital-to-analog converter to convert the demodulated data of the first type read from the buffer memory in response to a reference clock signal; and a frame clock signal generating circuit to generate a frame clock signal for use in accessing the buffer memory, the frame clock signal generator including: a division control circuit to generate a division control signal in accordance with an amount of the demodulated data stored in the buffer memory; a first divider to divide a constant clock signal in accordance with the division control signal, and to output a first divided clock signal; a second divider to output a second divided clock signal, a division factor in the second divider being fixed; a phase comparator to generate a phase control signal representative of a phase difference between the first and second divided clock signals; a voltage controlled oscillator to generate a controlled clock signal in response to the phase control signal so that a frequency of the controlled clock signal is varied in accordance with the amount of the demodulated data stored in the buffer memory, the controlled clock signal being supplied to the second divider; a selector to receive the constant clock signal and the controlled clock signal, to select one of the constant and controlled clock signals, and to output the selected clock signal; and a third divider to divide the selected clock signal to provide the frame clock signal, wherein, when the disc data to be reproduced is the first type, data, a frequency of the reference clock signal is set to a first value, and the selector selects the constant clock signal, and when the disc data to be reproduced is the second type data, the frequency of the reference clock signal is set to a second value lower than the first value so as to reduce power consumption of the digital-to-analog converter, and the selector selects the controlled clock signal.

In accordance with still further aspect or the present invention, the above-stated objects are achieved by providing a signal processing circuit for use in reproducing disc data capable of being classified into at least a first type data and a second type data, the disc data being stored on a disc to be rotated by a disc motor and read from the disc by an optical pickup, comprising: a demodulation circuit to demodulate the disc data read from the disc; a buffer memory to store the demodulated data read from the disc; a digital-to-analog converter to convert the demodulated data of the first type read from the buffer memory in response to a reference clock signal; and a frame clock signal generating circuit to generate a frame clock signal for use in accessing the buffer memory, the frame clock signal generator including: a division control circuit to generate a division control signal in accordance with an amount of the demodulated data stored in the buffer memory; a first divider to divide a constant clock signal in accordance with the division control signal, and to output a first divided clock signal; a second divider to output a second divided clock signal, a division factor in the second divider being fixed; a phase comparator to generate a phase control signal representative of a phase difference between the first and second divided clock signals; a voltage controlled oscillator to generate a controlled clock signal in response to the phase control signal so that a frequency of the controlled clock signal is varied in accordance with the amount of the demodulated data stored in the buffer memory, the controlled clock signal being supplied to the second divider; a selector to receive the constant clock signal and the controlled clock signal, to select one of the constant and controlled clock signals, and to output the selected clock signal; and a third divider to divide the selected clock signal to provide the frame clock signal, wherein, when the disc data to be reproduced is the first type data, a frequency of the reference clock signal is set to a first value, and the selector selects the constant clock signal, and when the disc data to be reproduced is the second type data, the frequency of the reference clock signal is set to a second value lower than the first value so as to reduce power consumption of the digital-to-analog converter, and the selector selects the controlled clock signal.

In accordance with yet still further aspect of the present invention, the above-stated objects are achieved by providing an apparatus and a signal processing circuit for reproducing disc data capable of being classified into at least a first type data and a second type data, the apparatus comprising: a demodulation circuit to demodulate the disc data read from the disc; a buffer memory to store the demodulated data; and a frame clock signal generating circuit to generate a frame clock signal for use in accessing the buffer memory, the frame clock signal generator including: a division control circuit to generate a division control signal in accordance with an amount of the demodulated data stored in the buffer memory; a first divider to divide a constant clock signal in accordance with the division control signal, and to output a first divided clock signal; a second divider to output a second divided clock signal, a division factor in the second divider being fixed; a phase comparator to generate a phase control signal representative of a phase difference between the first and second divided clock signals; a voltage controlled oscillator to generate a controlled clock signal in response to the phase control signal so that a frequency of the controlled clock signal is varied in accordance with the amount of the demodulated data stored in the buffer memory, the controlled clock signal being supplied to the second divider; a selector to receive the constant clock signal and the controlled clock signal, to select one of the constant and controlled clock signals, and to output the selected clock signal; and a third divider to divide the selected clock signal to provide the frame clock signal, wherein, when the disc data to be reproduced is the first type data, the selector selects the constant clock signal, and when the disc data to be reproduced is the second type data, the selector selects the controlled clock signal so as to control the frequency of the frame clock signal in accordance with the amount of demodulated data stored in the buffer memory.

The above-stated objects are achieved by also providing an apparatus for reproducing disc data capable of being classified into at least a first type data and a second type data, the second type data including a compressed image data composed of at least one of compressed photographic data and compressed video data, the apparatus comprising: a disc motor to rotate a disc storing the disc data; an optical pickup to read the disc data to be reproduced from the disc; a demodulation circuit to demodulate the disc data read from the disc; a buffer memory to store the demodulated data; and a decompression circuit to decompress the demodulated data of the second type data read from the buffer memory to obtain at least one of decompressed photographic data and decompressed video data, the decompression being conducted in response to a reference clock signal; wherein, when the disc data to be reproduced is the second type data, a frequency of the reference clock signal is set to a first value, and when the disc data to be reproduced is the first type data, the frequency of the reference clock signal is set to a second value lower than the first value so as to reduce power consumption of the decompression circuit.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which.

DESCRIPTION OF PREFERRED EMBODIMENTS

Embodiments of the present invention will be described in detail with reference to the drawings.

Figure 1:
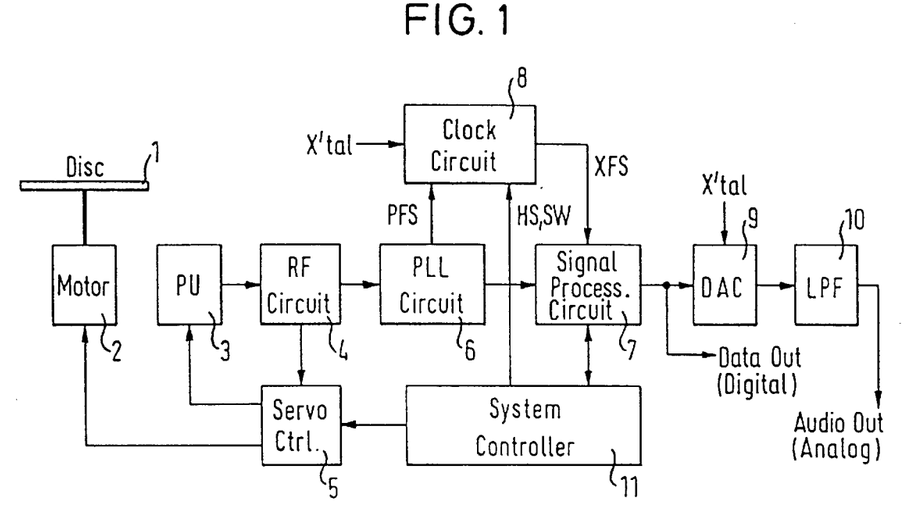
FIG. 1 is a block diagram of a disc data reproducing apparatus according to a first embodiment of the present invention.

Referring now to FIGS. 1–4, the first embodiment of a disc data reproducing apparatus and a signal processing circuit for reducing reproduction interruptions will be described in detail. FIG. 1 shows a disc data reproducing apparatus employing a CLV system. A disc 1 such as a CD (compact disc) is rotated by a disc motor 2, such as a spindle motor. Stored data on the disc 1 is read by an optical pickup (PU) 3, and the data read out is supplied to an EFM signal generation circuit (hereinafter called an RF circuit) 4. The RF circuit 4 extracts a focus error signal and a tracking error signal (hereinafter called ERRs) from an output of the optical pickup 3, and supplies these extracted signals to a servo control circuit 5. Further, the RF circuit 4 quantizes the signal read from the disc 1 and supplies a PLL circuit 6 with the quantized signal as the EFM signal. The PLL circuit 6 generates a reproducing stage reference clock signal (VCOCK) and a reproducing stage frame clock signal (PFS). These clock signals are synchronous with the EFM signal, and supplied to a signal processing circuit 7. The frame clock signal PFS is also supplied to a clock signal circuit 8. A center frequency of the clock signal VCOCK is 17.2872 MHz, which is four times a bit rate of the EFM signal. The bit rate of the EFM signal is 4.3218 MHz. The PLL circuit 6 also supplies the EFM signal to the signal processing circuit 7.

The servo control circuit 5 comprises a focus servo control circuit, a tracking servo circuit, a spindle servo control circuit, and a sled servo control circuit. The focus servo control circuit controls an optical focus of the pickup 3 to make the focus error signal equal to zero. The tracking servo control circuit controls an optical tracking of the pickup 3 to make the tracking error signal equal to zero. The spindle servo control circuit controls the disc motor 2, which drives the disc 1 at a predetermined speed, or a constant linear velocity (CLV). The sled servo control circuit moves the pick up 3 to a target track for adjusting an actuator position of the tracking servo to a center position of its allowable moving range.

The signal processing circuit 7 performs an EFM demodulation, a subcode demodulation, and an error correction processing. Output of the signal processing circuit 7 is supplied to a digital-to-analog converter (hereinafter called DAC) 9. An output of the DAC 9 is supplied to a low pass filter (LPF) 10, and output of the LPF 10 corresponds to a reproduced audio output signal. The ROM data, such as video information and character codes, is output from the signal processing circuit 7 as ROM data output, or digital output, without being processed in the DAC 9 and the LPF 10. A crystal oscillator clock signal (X'TAL) is fed to the DAC 9 as its reference clock signal.

A system controller 11 such as a microprocessor supplies the clock signal circuit 8 with control signals including a rate control signal (HS) and a clock signal switching signal (SW). The system controller 11 also supplies the signal processing circuit 7 and the servo control circuit 5 with many other control signals for play, stop, search, attenuating, etc. For the system controller, an 8-bit microcomputer TLCS-870 is available.

The system controller 11, which controls the whole system of the CD player, generates the signals HS and SW on the basis of subcode Q data (S.UBQ). The subcode data is obtained by reading a "Table of Contents" (TOC) on a lead-in area (radius 23 mm to 25 mm) on the disc. From the TOC, respective positions, or start addresses (start-time), of the audio data and ROM data (such as image data and character codes), and types of respective data are obtained.

The subcode Q data is also obtained by reading data stored on areas other than the lead-in area. The subcode Q data is demodulated by a subcode demodulating circuit 74 in FIG. 2 and supplied to the system controller 11. Therefore, the system controller 11 can generate the signals HS and SW in accordance with the designated, or required, data or according to the data type. When the designated data is the audio data, the signal SW of "L" level is generated to prevent a signal processing stage reference clock signal from being switched. On the other hand, when the designated signal is the ROM data, the signal SW of "H" level is generated.

Because the subcode Q data can be obtained during the reproduction process, the type of the data to be reproduced is detected during the reproduction process. Therefore a switching of the signal SW may occur during the reproduction process. This feature is useful when the audio data and ROM data coexist on one disc. The switching of the signal SW will be explained below.

After a disc is loaded into the disc player, the TOC is read. From the TOC, the system controller 11 determines a respective type (i.e., audio/ROM) of the data of each track number. The information obtained from the TOC is stored to a data storage (not shown in the figures), which is different from the buffer memory and is connected to the system controller 11. Then, the signal SW is set to "L" or "H" according to the data type of the first track. Therefore, the signal SW serves like a data type signal.

Next, when the disc data to be read is designated by using a start-time or a track number, the system controller determines the type of the designated disc data by using information in the data storage. Then, the system controller sets the signal "SW" to "L" or "H" according to the determination and has the signal processing circuit start reproducing.

If a change in the data type is detected—this change is detected by using the subcode Q data—during the reproduction of the data stored on the disc, the system controller 11 switches the signal "SW" from "L" to "H" or from "H" to "L". In this case, the disc is an audio/ROM type disc, on which the audio and ROM data coexist on the disc.

Contrary, if the change in the data type is not detected during the reproduction of all the data stored on the disc, the disc is an audio-type disc on which only the audio type data exist, or a ROM type disc on which the ROM type data exist on the disc.

The clock signal circuit 8 will be explained next. The clock signal circuit 8, according to the signals HS and SW, generates the signal processing stage reference clock signal (MCK) from a crystal oscillator clock signal (XCK) or a voltage controlled oscillator clock signal (VCK). The crystal oscillator clock signal (XCK) is supplied from a crystal oscillator (X'tal). The reproduction stage reference clock signal (VCOCK) is a PLL clock signal generated by the PLL circuit 6. Subsequently, the clock signal circuit 8 divides the clock signal XCK by 2304 to generate a signal processing stage frame clock signal (MFS), which is used as a reading frame clock signal for a buffer memory in the signal processing circuit 7. The clock signal circuit 8 outputs the clock signal XCK as a servo control reference clock signal (SCK).

Figure 2:
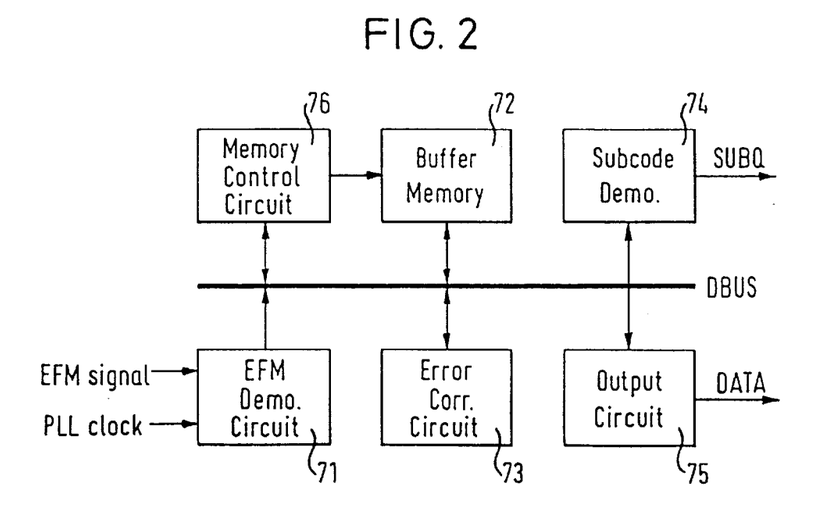
FIG. 2 is a block diagram of a signal processing circuit according to the first embodiment of the present invention.

The signal processing circuit 7 will be described in detail with reference to FIG. 2. The signal processing circuit 7 comprises an EFM demodulating circuit 71, a buffer memory 72, an error correction circuit 73, a subcode demodulating circuit 74, an output circuit 75, and a memory control circuit 76. The EFM demodulating circuit 71 receives the reproducing stage reference clock signal (VCOCK) which is generated by the PLL circuit 6 and is synchronous with the EFM signal. A synchronizing signal, i.e., a sync pattern, is extracted from the EFM signal and the EFM signal is demodulated and stored into the buffer memory 72 via a data bus (DBUS) as 33-symbol data, per one frame, which consists of 1-symbol subcode data and 32-symbol main data including parity data.

The buffer memory 72 is used for jitter absorption and an interleaving in the error correction process. The jitter on the time axis is absorbed, or eliminated by writing the demodulated EFM signal to the buffer memory 72 in synchronism with the reproduction stage frame clock signal (PFS) and by reading in synchronism with the signal processing stage frame clock (MFS) which is generated by the clock signal circuit 8. Output of the buffer memory 72 is supplied, via the data bus (DBUS), to the error correction circuit 73, in which C1 and C2 system error corrections are performed. Such C1 and C2 system error corrections are disclosed in "Principles of Digital Audio" (ISBN:0-672-22388-0) Chap. 6, Sec 6.3 ("Error Correction"), Ken C. Pohlmann (1987). The error corrected data is again stored to the buffer memory 72 in synchronism with the clock signal MFS. Subsequently, the error corrected data is read from the buffer memory 72 in synchronism with the clock signal MFS, and supplied to the output circuit 75. The output circuit 75 outputs reproduced data (DATA) after, if unable-to-be-corrected data exists, mean value interpolations and mute functions are performed. The subcode demodulating circuit 74 reads out subcode data from the buffer memory 72, performs an error check or a subcode-Q data (one component of the subcode), and outputs the result (SUBQ) to the system controller 11. It is preferable to read subcode data with the C1 system error correction. Here, the subcode data is stored to and read from the buffer memory. However, it is possible to demodulate the subcode data without using the buffer memory for subcode processing.

The memory control circuit 76 outputs control signals such as a row address signal, a column address signal, a row address strobe signal ($\overline{RAS}$), a column address strobe signal ($\overline{CAS}$), and a read/write signal (R/W) to the buffer memory 72. On detecting falling edges of the-signals $\overline{RAS}$ and $\overline{CAS}$, the buffer memory 72, such as a 16 k-bit DRAM, latches the row address and column address signals, respectively. In this case, the address to be supplied to the buffer memory 72 is classified into one of the following four kinds. These addresses are a Wr address for writing the demodulated EFM data in the buffer memory 72, a C1 address for reading CI system data to detect an error of the C1 system from the data written in the buffer memory 72 and for writing in and reading from the buffer memory 72 to correct the detected erroneous data, a C2 address for reading C2 system data to detect an error of the C2 system from the data written in the buffer memory 72 and for writing in and reading from the buffer memory 72 to correct the detected erroneous data, and an Re address for reading the data from the buffer memory 72 to output to the DAC 9.

If the buffer memory is instead provided as a 16 k-bit SRAM, it can be controlled by the read/write signal (R/W), a chip-enable signal ($\overline{CE}$), and an 11-bit address signal instead of the row address signal, the column address signal, the row address strobe signal ($\overline{RAS}$), the column address strobe signal ($\overline{CAS}$), and the read/write signal (R/W).

The memory control circuit 76 has an address circuit (not shown in FIG. 2) including two counters. One of the counters counts up the reproduction stage frame clock signal (PFS) generated on the basis of a frame synchronizing signal of the EFM data read from the disc 1, and generates the frame address of Wr. As a result, jitter occurs during the write-in processing of the demodulated EFM data into the buffer memory. The other counter counts the signal processing stage frame clock signal (MFS), and generates the frame addresses of C1, C2, and Re. As described above, while writing of the demodulated EFM data is performed using the Wr address in synchronism with the clock signal PFS, the reading is performed using the Re address in synchronism with the clock signal MFS.

When the clock signal switching signal (SW) represents "L" (low level), the constant frame clock signal which is obtained by simply dividing the crystal oscillator clock signal (XCK) is used as the signal processing stage frame clock signal (MFS). As a result, write and read operations absorb the jitter on the time axis. Then, the demodulated data from the signal processing circuit is output via the DAC and the LPF to analog equipment such as speakers.

When the signal SW represents "H" (high level), another frame clock signal which is varied in accordance with the amount of data in the buffer memory is used as the signal processing stage frame clock signal (MFS). As a result, the jitter is not absorbed, and the underflow and overflow are prevented in the buffer memory 72. Here, the demodulated data from the signal processing circuit is output without going through the DAC and the LPF. In this case, the jitter in the output data signals does not cause a problem, because the output data signals from the signal processing circuit 7 are not output directly as an audio signal in systems such as CD-ROM players for computer-drive use. This is because a computer has large-capacity storage devices such as semiconductor memories and a magnetic-hard-disc drive, and such storage devices can absorb the jitter.

Figure 3:
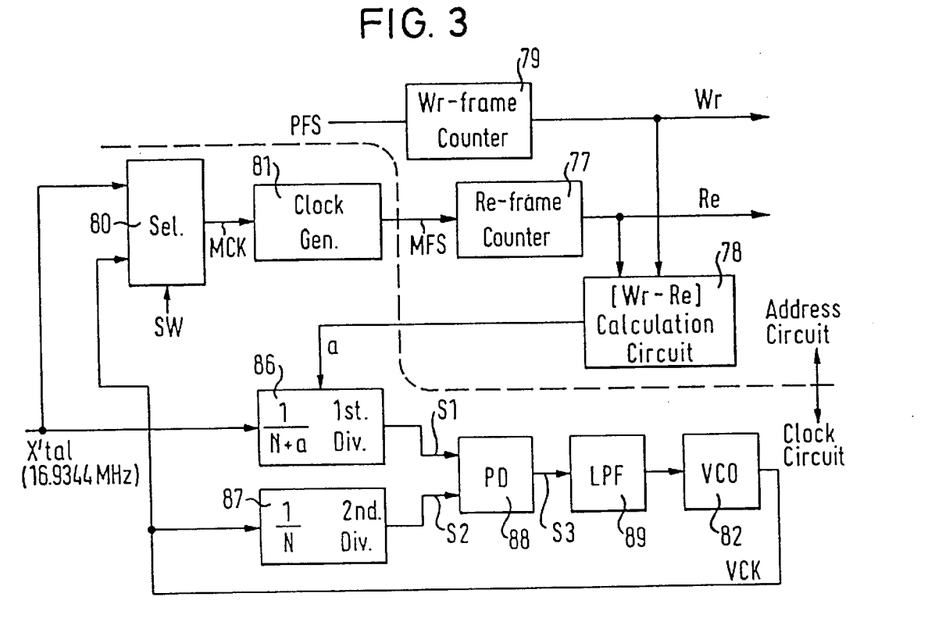
FIG. 3 is a block diagram of a part of a clock signal circuit according to the first embodiment of the present invention.

FIG. 3 is a block diagram showing the clock signal circuit 8 and the address circuit in the memory control circuit 76. The clock signal circuit 8 comprises a selector 80, a clock signal generator 81, a voltage controlled oscillator (VCO) 82, a first divider 86, a second divider 87, a phase comparator (PD) 88, and a low-pass filter (LPF) 89. The address circuit comprises a Re-frame address counter 77, a [Wr-Re] calculation circuit 78, and a Wr-frame address counter 79.

Output (VCK) of the voltage controlled oscillator (VCO) 82 is, via the selector 80, supplied to the clock signal generator 81 as the signal processing stage reference clock signal (MCK), which generates clock signals (for example, MFS) required for signal processing. A free-run frequency of the VCO is 16.9344 MHz, which is the same as the frequency of a crystal oscillator (X'tal, not shown in this figure). The output of the clock signal generator 81 is the signal processing stage frame clock signal (MFS) and is normally 7.35 kHz. This frame clock signal MFS is supplied to the Re-frame counter 77, which is in the address circuit in the memory control circuit 76 and counts up each one frame on the basis of the clock signal MFS. Output of the Re-frame counter 77 is an Re address and is supplied to one input of the [Wr-Re] calculation circuit 78. To the other input of the calculation circuit 78, a Wr address, which is generated by the Wr-frame counter 79, is supplied. The Wr-frame counter 79 counts up each one frame on the basis of the reproduction stage frame clock signal (PFS).

The [Wr-Re] calculation circuit 78 calculates the difference between the output of the Wr-frame counter 79 and the Re-frame counter 77, and outputs a division control signal (a) which controls the denominator of the division in the first divider 86. Therefore, the calculation circuit 78 controls the division in the first divider 86. This first divider 86, to which the clock signal X'tal at the frequency of 16.9344 MHz is input, divides this clock signal by N+a, so that the denominator of this division factor is varied in accordance with the division control signal (a) generated by the [Wr-Re] calculation circuit 78 in the memory control circuit 76. For example, values for the division control signal (a) are 0, a positive number, and a negative number. The second divider 87, to which the output (VCK) of the VCO 82 is input, has a fixed division factor, i.e., it performs a division by N. The output of the first and second dividers 86 and 87 are supplied to the phase comparator (PD) 88, whose output (S3) is supplied to the VCO 82 via the LPF 89.

The VCO controls the frequency of its output clock signal VCK to reduce the frequency difference between the output of the first and second dividers 86 and 87. For example, the relationship between the clock signals VCK and X'tal is defined as follows (Table. 1).

TABLE 1

| a = 0 | VCK = X'tal |
| a > 0 | VCK < X'tal |
| a < 0 | VCK > X'tal |

As a numerical example, suppose that a jitter absorption capacity of the buffer memory 72 is 12 frames, the current write address normally leads the current read address by 7 frames. Therefore, a difference D between the values represented by the two frame counters, i.e., the Wr-frame counter and the Re-frame counter, is usually 7 frames. Each counter counts up by every one frame. When a rotation speed of the disc motor is at a normal speed for the normal rate reproduction or the double rate reproduction, the difference D is 7. However, when the rotation speed of the disc motor is slower than that of the normal speed, the Wr-frame counter counts up slower than the Re-frame counter to reduce the difference D. On the other hand, when the rotation speed of the disc motor is faster than that of the normal speed, the Wr-frame counter counts up faster than the Re-frame counter to increase the difference D. Then, if the difference, i.e., [Wr-Re], is reduced to 0 or increased to 12, the underflow or overflow may occur in the buffer memory 72 and an unable-to-be-corrected error may be detected in the error correction processing.

In this embodiment of the present invention, to avoid the underflow or overflow described above, the denominator in the first divider 86 is varied. Consequently, the oscillation frequency of the voltage controlled oscillator (VCO) 82 is controlled to make the frequency of the signal processing stage frame clock signal (MFS, which is generated by the clock signal generator 81) keep up with that of the reproduction stage frame clock signal (PFS). For example, the division control signal (a), according to the difference generated as represented below (Table. 2)

TABLE 2

| D = 1 to 3 | Set the control signal (a) to a positive number. |
| D = 7 to 12 | Reset the control signal (a) to 0 (zero) |
| D = 10 to 12 | Set the control signal (a) to a negative number. |
| D = 1 to 6 | Reset the control signal, (a) to 0 (zero) |

According to the characteristic of the VCO, the positive and the negative numbers for the control signal (a) are set to a suitable value, for example, an absolute value for the control signal (a) is set to a value of 25% of the denominator (the division factor) of the second divider 87.

In the above described circuits, the frequency of the processing stage frame clock signal (MFS) is varied to avoid the occurrence of the underflow or overflow during the transient period in which the rotation speed of the disc motor is not a predetermined speed. When the rotation speed of the disc motor is slower than the predetermined speed, the difference D decreases. If the difference decreases to 3, the division control signal (a) is set to a positive number to reduce the oscillation frequency of the VCO 72. Therefore, the frequency of MFS is also reduced to increase the difference D ([Wr-Re]). When the difference D is increased to 7, the division control signal (a) is reset to 0, and the frequency of VCK keeps up with that of the X'tal. On the other hand, when the rotation speed of the disc motor is faster than the predetermined speed, the difference D increases. If the difference increases to 10, the division control signal (a) is set to a negative number to increase the oscillation frequency of the VCO 72. Therefore, the frequency of MFS is also increased to decrease the difference D ([Wr-Re]). When the difference D is decreased to 6, the division control signal (a) is reset to 0, and the frequency of VCK keeps up with that of the X'tal.

In summary, in this embodiment of the present invention, because the oscillation frequency of the VCO is varied to make the signal processing stage frame clock signal (MFS) keep up with that of the reproduction stage frame clock signal (PFS), the underflow and overflow are avoided. Consequently, the reproduced data is obtained more quickly.

In addition, when the signal processing stage frame clock signal (MFS) is not to be varied according to the reproduction stage frame clock signal (PFS), for example when the audio data is reproduced, the control signal SW of "L" level is supplied from the system controller 11 to the selector 80. On the reception of the control signal SW of the "L" level, the selector 80 selects the crystal oscillator clock signal X'tal and outputs it to the clock signal generator 81 as the signal processing stage reference clock signal (MCK). On the other hand, when the control signal SW of "H" level is supplied from the system controller 11 to the selector 80, the selector 80 selects the output (VCK) of the VCO 82 and outputs it to the clock signal generator 81. In this case, with the [Wr- Re] calculation circuit 78 outputting the division control signal (a) according to its inputs, the signal processing stage frame clock signal (MFS) varies in accordance with the speed difference between the writing to the buffer memory 72 and the reading from the buffer memory 72.

Next, a more detailed explanation for the first divider 86, the second divider 87, and the phase comparator 88 will be provided.

The first divider 86, to which the crystal oscillator clock signal (XCK) is input, is an N+a division counter, i.e., a variable divider. The value N of the first divider 86, is the same as that of the second divider 87, and is 512. The values for "a" are, according to the difference [Wr-Re], −127, and +128. Therefore, the denominators of the first divider 86 are 385, 512, and 640. This means that the denominator ranges from −25% to +25% of the value N, i.e., 512.

The second divider 87, to which the output (VCK) of the VCO 82 is input, is a N division counter. The value N for 9-bit counter is, for example, 512.

Figure 4:
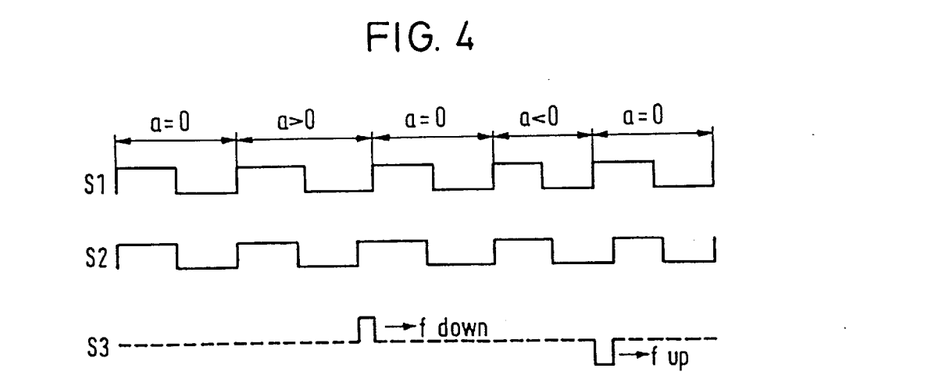
FIG. 4 is a timing chart showing the relationship among a division control signal (a) and the signals S1–S3.

The relationship between the value "a", the output (S1) of the first divider 86, the output (S2) of the second divider 87, and the output (S3) of the phase comparator 88 is shown in FIG. 4. The phase comparator (PD) 88 compares the output (SI) of the first divider with the output (S2) of the second divider and generates the signal S3 as follows (Table. 3).

TABLE 3

| "a" | phase difference | the signal S3 |
| --- | --- | --- |
| a = 0 | none | "Hiz" (high performance) |
| a > 0 | S2 is leading | "H" from The rising edge of S2 to the rising edge of S1 (→f down) |
| a < 0 | S1 is leading | "L" from the rising edge of S1 to the rising edge of S2 (→f down) |

The output of the LPF 89 is normally 2.5 V when the input S3 from the phase comparator 88 represents "Hiz" (high impedance). If the input S3 represents "H" for some successive duration, the output of the LPF 89 goes over 2.5 V, and if the input S3 represents "L" for some successive duration, the output goes under 2.5 V. This output controls the oscillation frequency of the VCO 82.

In the embodiment described above, because the subcode is synchronous with the signal processing stage reference clock signal, the subcode data is always synchronous with the reproduced data. The data is written to the buffer memory and read from the buffer memory every one subcode block.

As previously noted, disc data reproduction apparatus can demodulate the subcode data without writing to the buffer memory. In such reproduction apparatus, the subcode data is output in synchronism with the signal processing stage reference clock signal (VCOCK), which is generated by the PLL circuit and is synchronous with the EFM signal. Therefore, because the reproduced data is output in synchronism with the signal processing stage reference clock signal, a time lag between the subcode data and the reproduced data may be generated. However, the present invention is applicable to such type of reproduction apparatus.

Further, some disc data reproduction apparatus and their signal processing circuit comprise a circuit for varying the frequency, or pitch, of the audio data in accordance with an external input. This circuit is called a "variable pitch circuit." This variable pitch circuit includes a first divider, a second divider, a phase comparator, a low-pass filter, and a voltage controlled oscillator, so that this embodiment of the present invention may be achieved by adding and modifying a few circuits to avoid underflow or overflow. As a result, in such apparatus, the practice of this embodiment can be realized at low cost.

Further, the signal processing circuit 7 and the PLL circuit 6 may be formed on the same semiconductor chip. Moreover, these two circuits 7 and 6, the clock signal circuit 8, the servo control circuit 5, and the DAC 9 may be formed on the same semiconductor chip.

Next, a second embodiment of the present invention will be described with reference to FIGS. 5 to 7.

Figure 5:
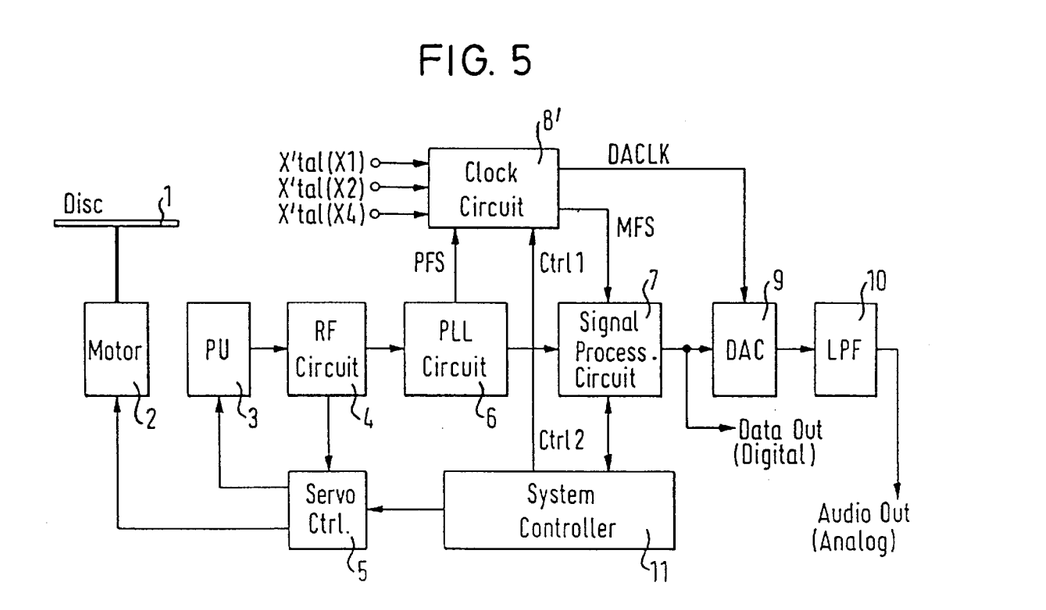
FIG. 5 is a block diagram of a disc data reproducing apparatus according to a second embodiment of the present invention.

FIG. 5 shows a block diagram of disc data reproducing apparatus according to the second embodiment. Common feature of FIGS. 1 and 5 are identified with the same reference numeral. FIGS. 6 and 7 show a part of a clock signal circuit 8'. The disc data reproducing apparatus of FIG. 5 differs from that of FIG. 1 in that a clock signal DACLK is supplied from the clock signal circuit 8' to the DAC 9, and three oscillator clock signals are supplied to the clock signal circuit 8'. These three clock signals are a first crystal oscillator clock signal (X'tal(X1)) for a normal reproduction rate, a second crystal oscillator clock signal (X'tal(X2)) for a double reproduction rate, and a third crystal oscillator clock signal (X'tal(X4)) for a quadruple reproduction rate. The clock signal to be supplied to the DAC 9 is selected in accordance with a first and a second control signal (Ctrl 1 and Ctrl 2). In contrast, in a conventional system, an externally-supplied crystal oscillator clock signal (for example, having an oscillation frequency of 16.9344 MHz) is always supplied to the DAC 9 as the reference clock signal.

Figure 6:
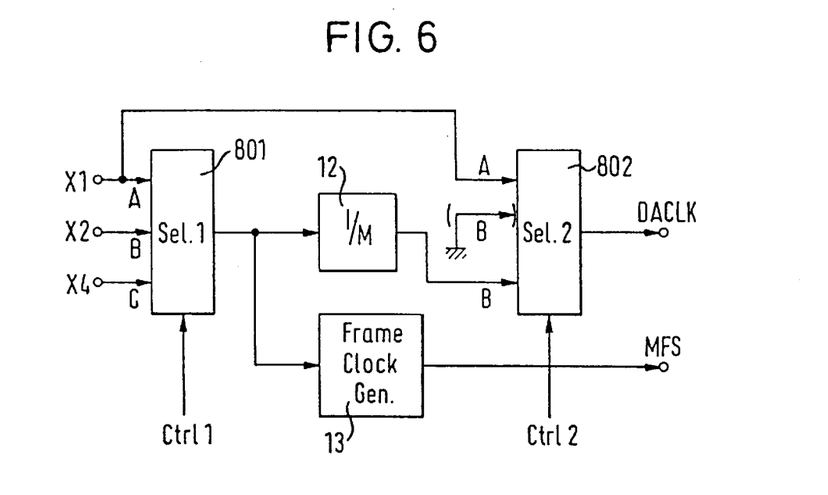
FIG. 6 is a block diagram showing one circuit configuration of the clock signal circuit 8'.

FIG. 6 shows a configuration of a part of the clock signal circuit 8' in FIG. 5. A first selector (Sel. 1) 801, having inputs A, B, and C to which the clock signals X'tal(X1), X'tal(X2), and X'tal(X4) are input, respectively, selects one of the inputs in accordance with the first control signal (Ctrl 1). The clock signal X'tal(X1) is also input to a second selector (Sel. 2) 802. Output of the Sel. 1 is fed to an M divider (1/M) 12, whose output is fed to an input B of the second selector (Sel. 2) 802. Output of the Sel. 1 is also supplied to a frame clock signal generation circuit 13, whose output as the signal processing stage frame clock signal (MFS) is supplied to the signal processing circuit 7. The Sel. 2 selects one of the inputs A and B in accordance with the second control signal (Ctrl 2), and outputs the selected one as the reference clock signal (DACLK) to the DAC 9. Reading the data from the buffer memory 72 is conducted in response to the frame clock signal (MFS).

A two-bit rate control signal (HS) can, for example, be provided as the first control signal (Ctrl 1). This rate control signal (HS) represents a reproduction rate of the ROM data, and is supplied from the system controller 11 in accordance with the instruction by an user. The first selector (Sel. 1) selects the input A when the first control signal (Ctrl 1) represents "00" (binary code), the input B when the Ctrl 1 is "10", and the input C when the Ctrl 1 is "11". A clock signal switching signal (SW) can, for example, be provided as the second control signal (Ctrl 2). This clock signal switching signal (SW) represents whether the data to be reproduced is audio data or ROM data, i.e., represents a data type. The type is identified according to control data in the subcode-Q data. The number (M) of the M divider (1/M) 12 is set to sufficiently reduce power consumption in the DAC 9, and for example, is set to a number ranging from 100 to 500.

Next, the operation of the clock signal circuit 8' will be explained.

When the signal Ctrl 1 is "00" and the signal Ctrl 2 is "0" ("L"), the reproduction state is the normal rate for audio data. The first selector (Sel. 1) selects the clock signal X'tal(X1) to have the frame clock signal generation circuit 13 generate the reproduction stage frame clock signal (MFS). This frame clock signal (MFS) is fed to the signal processing circuit 7 to conduct read-out of data from the buffer memory in response to the frame clock signal. At this time, the second selector (Sel. 2) selects its input A to output the clock signal X'tal(X1) as the reference clock signal (DACLK) of the DAC 9. Here, the demodulated data from the signal processing circuit 7 is output after the digital-to-analog conversion in the DAC 9.

When the signal Ctrl 1 is "10" and the signal Ctrl 2 is ("H"), the reproduction state is the double rate for ROM data. The first selector (Sel. 1) selects the clock signal X'tal(X2) to have the frame clock signal generation circuit 13 generate the reproduction stage frame clock signal (MFS). The frequency of the selected clock signal X'tal(X2) is reduced by the M divider 12 to sufficiently reduce power consumption in the DAC 9. At this time, the second selector (Sel. 2) selects its input B to output the divided clock signal as the reference clock signal (DACLK) of the DAC 9.

Here, the demodulated data from the signal processing circuit 7 is output without the digital-to-analog conversion in the DAC 9. In this reproduction state, reduction in the frequency of the reference clock signal to the DAC 9 leads to no problem, because the data to be reproduced is the ROM data which does not need digital-to-analog conversion.

When the signal Ctrl 1 is "00", and the signal Ctrl 2 is "1" ("H"), the reproduction state is the normal rate for ROM data. Usually, the ROM data is reproduced at the double rate to achieve faster access as possible. However, because the data cannot be reproduced at any faster rate than the normal rate when a disc quality is poor, such a state can occur. In this state, the first selector (Sel. 1) selects the clock signal X'tal(X1). The frequency of the selected clock signal X'tal (X1) is reduced by the M divider 12 to sufficiently reduce power consumption in the DAC 9. At this time, the second selector (Sel. 2) selects its input B to output the divided clock signal as the reference clock signal (DACLK) of the DAC 9. In this reproduction state, reducing the frequency of the reference clock signal to the DAC 9 also leads to no problem, because the data to be reproduced is ROM data which does not need digital-to-analog conversion.

While a detailed description is omitted here, the reproduction state is the quadruple rate for the ROM data when the signal Ctrl 1 is "11" band the signal Ctrl 2 is "1" ("H").

Further, when the signal Ctrl 2 is "1", the second selector may select an input of a ground potential level alternatively to the output of the M divider 12 in order to omit the M divider, as diagrammatically shown in FIG. 6.

Figure 7:
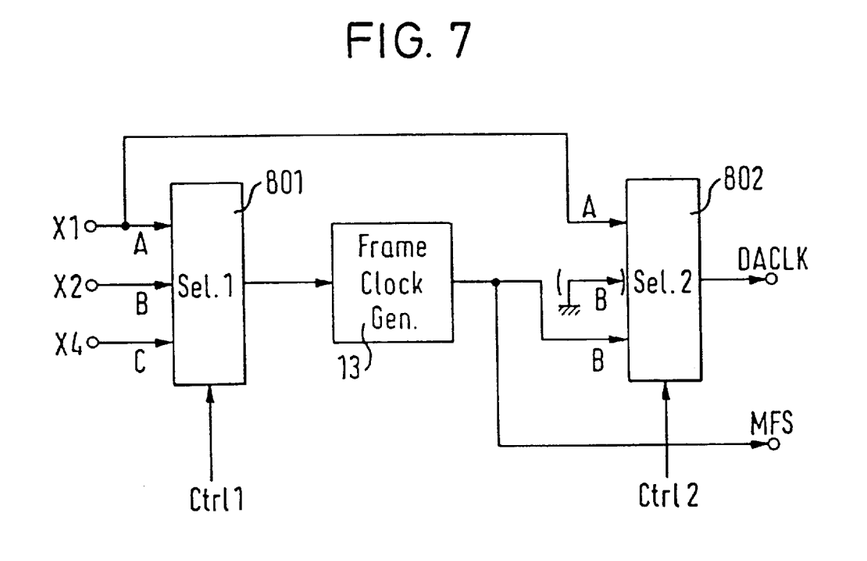
FIG. 7 is a block diagram showing another circuit configuration of the clock signal circuit 8'.

FIG. 7 shows another configuration of the clock signal circuit 8'. Common features between FIGS. 6 and 7 are shown with the same reference numerals. Here, the output of the first selector (Sel. 1) 801 is fed to the frame clock signal generation circuit 13 only. The output of this frame clock signal generation circuit 13 is used as the signal processing stage frame clock signal (MFS), and is supplied to the input B of the second selector (Sel. 2) 802. The frame clock signal generation circuit 13 is, for example, a 2304 divider, which divides, —at the normal rate—the clock signal X'tal(x1) at 16.9344 MHz by 2304 to generate the frame clock signal at 7.35 kHz.

Next, the operation of the circuits in FIG. 7 will be explained.

When the signal Ctrl 1 is "00" and the signal Ctrl 2 is "0" ("L"), the reproduction state is a normal rate for audio data. The first selector (Sel. 1) selects the clock signal X'tal(X1) to have the frame clock signal generation circuit 13 generate the reproduction stage frame clock signal (MFS). This frame clock signal (MFS) is fed to the signal processing circuit 7 to conduct read-out of data from the buffer memory in response to the frame clock signal. At this time, the second selector (Sel. 2) selects its input A to output the clock signal X'tal(X1) as the reference clock signal (DACLK) of the DAC 9.

When the signal Ctrl 1 is "10" and the signal Ctrl 2 is "1" ("H"), the reproduction state is the double rate for ROM data. The first selector (Sel. 1) selects the clock signal X'tal(X2) to have the frame clock signal generation circuit 13 generate the reproduction stage frame clock signal (MFS). At this time, the second selector (Sel. 2) selects its input B to output the output of the frame clock signal generation circuit 13 as the reference clock signal (DACLK) of the DAC 9. Because the output of the frame clock signal generation circuit 13 has been divided by 2304, the frequency of the reference clock signal to the DAC 9 is reduced to reduce power consumption of the DAC 9.

When the signal Ctrl 1 is "00" and the signal Ctrl 2 is "1" ("H"), the reproduction state is the normal rate for ROM data. In this state, the first selector (Sel. 1) selects the clock signal X'tal(XI). The frequency of the selected clock signal X'tal(XI) is divided by the frame clock signal generation circuit 13. At this time, the second selector (Sel. 2) selects its input B to output the divided clock signal as the reference clock signal (DACLK) of the DAC 9 in order to reduce power consumption in the DAC 9.

In these two reproduction states, reduction in the frequency of the reference clock signal to the DAC 9 leads to no problem, because the data to be reproduced is ROM data which does not need digital-to-analog conversion.

In the configuration shown in FIG. 7, because the frame clock signal MFS is used as the reference clock signal (DACLK) to the DAC 9, the M divider included in FIG. 6 is omitted.

According to the circuit configurations in FIGS. 6 and 7, although the first and second control signals (Ctrl 1 and Ctrl 2) are discrete signals, the most significant bit (MSB) of the first control signal may be used as the second control signal (Ctrl 2). However, in such case the power consumption of the DAC 9 would not be reduced at the normal rate for the ROM data. This is because that the MSB, i.e., the second control signal (Ctrl 2), is "0" to select the clock signal X'tal(x1) as the reference clock signal for the DAC 9.

Further, when the signal Ctrl 2 is "1", the second selector may select an input B' at a ground potential level alternatively to the output of the frame clock signal generation circuit 13. If the input B' is selected in the second selector, the clock signal supply to the DAC 9 is halted. However, in some types of digital-to-analog converter circuits, suspension of the reference clock signal supply results in an increased leakage current, which leads to higher power consumption. Therefore, care must be taken with clock signal supply suspension.

Still further, other circuits than the 2304 divider may be used as the frame clock signal generation circuits in FIGS. 6 and 7. For instance, the clock signal circuit shown in FIG. 3 is applicable to the frame clock signal generating circuit.

Also, these circuit configurations to reduce power consumption are applicable to the disc data reproducing apparatus in which the signal processing stage reference clock signal is generated by thinning-out the reproduction stage reference clock signal which is generated in accordance with the EFM signal. This type of apparatus is disclosed in U.S. patent application Ser. No. 08/288,785.

Next, further embodiment of the present invention will be described with reference to FIG. 8.

Figure 8:
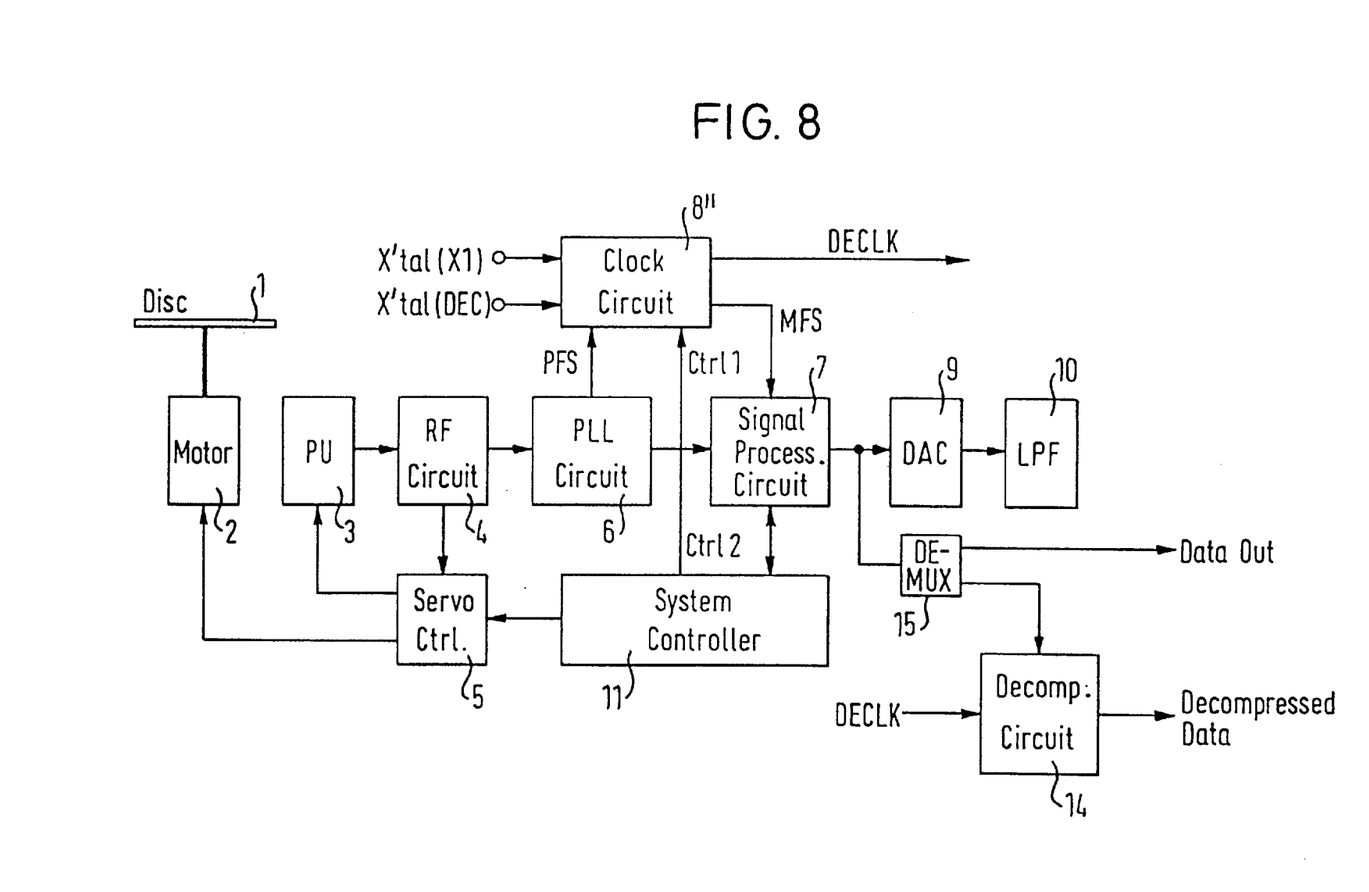
FIG. 8 is a block diagram of a disc data reproducing apparatus according to the further embodiment of the present invention.

FIG. 8 shows the disc data reproducing apparatus including a decompression circuit 14 to decompress the compressed image (i.e., photographic and video) data. Common features among FIGS. 1, 5, and 8 are shown with the same reference numerals. The clock circuit 8" provides a reference clock signal DECLK to the decompression circuit 14, which receives the digital output from the signal processing circuit 7 via demultiplexer 15. Decompressed data is output from the decompression circuit 14. To a clock circuit 8", a crystal oscillator clock signal X'tal(DEC), whose frequency is higher than 10 MHz, is supplied to generate a reference clock signal for the decompression circuit 14 according to the type of data to be reproduced.

When the data to be reproduced is the ROM data, the reference clock signal DECLK at a first frequency is supplied to the decompression circuit 14 to conduct the decompression. For example, the first frequency is at 50 MHz. In this case, because the amount of data to be processed is lager than that of the audio data, the first frequency of the reference clock signal DECLK is higher than that of the reference clock signal DACLK in the above embodiments.

When the data to be reproduce is the audio data, the reference clock signal DECLK at a second frequency which is lower than the first frequency is supplied to the decompression circuit 14. These clock switching is conducted in accordance with the type of data to be reproduced as described in the aforementioned embodiments.

In this embodiment, while the reference clock signal (DACLK) for the digital-to-analog converter (DAC) is not shown, the reference clock (DACLK) for the digital-to-analog converter may be controlled like in the second embodiment. Namely, when the data to be reproduced is the audio data, the frequency of the reference clock signal DECLK is set to a reduced value to reduce the power consumption in the decompression circuit, and the frequency of the reference clock signal DACLK is set to a normal frequency to conduct the digital-to-analog conversion. Contrary, when the data to be reproduced is the video data, i.e., ROM data, the frequency of the reference clock signal DACLK is set to a reduced value to reduce the power consumption in the digital-to-analog converter, and the frequency of the reference clock signal DECLK is set to a normal frequency to conduct the decompression circuit.

The disc data reproducing apparatus including the above decompression circuit may be provided as a digital video disc (DVD) player.

As described above, according to one feature of the present invention, the reading-out clock signal for the buffer memory may be controlled in accordance with the amount of data in the buffer memory, and in accordance with the attribute, or type, data to be reproduced. Thus, overflow and underflow do not occur the interruption of the data reproduction is very short, and the reproduced data is available before the disc motor reaches the required speed.

According to another feature of the present invention, in accordance with the attribute, or type, of data to be reproduce the frequency of the reference clock signal to the digital-to-analog converter or decompression circuit is decreased to reduce power consumption thereof.

While there has been illustrated and described what are presently considered to be preferred embodiments of the present invention, it will be understood by those skilled in the art the various changes and modifications may be made, and equivalents be substituted for devices thereof without departing from the scope of the invention. In addition many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. An apparatus for reproducing disc data capable of being classified into at least a first type data and a second type data, the apparatus comprising:

a disc motor to rotate a disc storing the disc data;

an optical pickup to read the disc data to be reproduced from the disc;

a demodulation circuit to demodulate the disc data read from the disc;

a buffer memory to store the demodulated data; and a digital-to-analog converter to convert the demodulated data of the first type data read from the buffer memory in response to a reference clock signal;

wherein, when the disc data to be reproduced is the first type data, a frequency of the reference clock signal is set to a first value, and when the disc data to be reproduced is the second type data, the frequency of the reference clock signal is set to a second value lower than the first value so as to reduce power consumption of the digital-to-analog converter.

2. The apparatus according to claim 1 further comprising:

a selector to receive a first clock signal having the first value and a second clock signal having the second value, and to provide one of the first and second clock signals as the reference clock signal in response to a data type signal (SW).

3. The apparatus according to claim 1 wherein the first type data is audio data, and the second type data is ROM data.

4. The apparatus according to claim 1 wherein when the disc data to be reproduced is the second type data, the demodulated data is output without the digital-to-analog conversion.

5. The apparatus according to claim 1, further comprising a frame clock signal generating circuit to generate a frame clock signal for use in accessing the buffer memory, wherein when the disc data to be reproduced is the second type data, the frame clock signal is supplied to the digital-to-analog converter as the reference clock signal so that the digital-to-analog conversion is conducted in response to the frame clock signal.

6. The apparatus according to claim 1 wherein a data type designation to the disc data to be reproduced is conducted in accordance with the subcode data read from the disc.

7. A signal processing circuit for use in reproducing disc data capable of being classified into at least a first type data and a second type data, the disc data being stored on a disc to be rotated by a disc motor and read from the disc by an optical pickup, comprising:

a demodulation circuit to demodulate the disc data read from the disc;

a buffer memory to store the demodulated data read from the disc; and a digital-to-analog converter to convert the demodulated data of the first type data read from the buffer memory in response to a reference clock signal;

wherein, when the disc data to be reproduced is the first type data, a frequency of the reference clock signal is set to a first value, and when the disc data to be reproduced is the second type data, the frequency of the reference clock signal is set to a second value lower than the first value so as to reduce power consumption of the digital-to-analog converter.

8. The signal processing circuit according to claim 7 further comprising:

a selector to receive a first clock signal having the first value and a second clock signal having the second value, and to provide one of the first and second clock signals as the reference clock signal in response to a data type signal (SW).

9. The signal processing circuit according to claim 7 wherein the first type data is audio data, and the second type data is ROM data.

10. The signal processing circuit according to claim 7 wherein when the disc data to be reproduced is the second type data, the demodulated data is output without the digital-to-analog conversion.

11. The signal processing circuit according to claim 7, further comprising a frame clock signal generating circuit to generate a frame clock signal for use in accessing the buffer memory, wherein when the disc data to be reproduced is the second type data, the frame clock signal is supplied to the digital-to-analog converter as the reference clock signal so that the digital-to-analog conversion is conducted in response to the frame clock signal.

12. The signal processing circuit according to claim 7 wherein a data type designation to the disc data to be reproduced is conducted in accordance with the subcode data read from the disc.

* * * * *